United States Patent
Oku et al.

(10) Patent No.: US 6,803,944 B2
(45) Date of Patent: Oct. 12, 2004

(54) INVADER DETECTOR AND CONTROLLER

(75) Inventors: Kouji Oku, Kobe (JP); Shinji Yakura, Kobe (JP); Seiji Akiyama, Kobe (JP)

(73) Assignee: Fujitsu Ten Limited, Kobe (JP)

(*) Notice: Subject to any disclaimer, the term of this patent is extended or adjusted under 35 U.S.C. 154(b) by 70 days.

(21) Appl. No.: 10/366,342

(22) Filed: Feb. 14, 2003

(65) Prior Publication Data

US 2003/0174052 A1 Sep. 18, 2003

(30) Foreign Application Priority Data

Feb. 18, 2002 (JP) ........................................ 2002-039470

(51) Int. Cl.[7] .............................................. G01S 15/89
(52) U.S. Cl. ........................ 348/163; 348/151; 348/155; 348/162; 348/163; 318/467; 340/541
(58) Field of Search ................................. 348/151, 154, 348/155, 162, 163; 318/467; 340/541

(56) References Cited

U.S. PATENT DOCUMENTS

| 4,736,218 A | * | 4/1988 | Kutman ........................ 396/427 |
| 4,918,473 A | * | 4/1990 | Blackshear ................... 396/427 |
| 5,351,078 A | * | 9/1994 | Lemelson ..................... 348/135 |
| 6,497,813 B2 | * | 12/2002 | Ackerson et al. ............ 208/311 |
| 2001/0055486 A1 | * | 12/2001 | Visram ......................... 396/419 |
| 2004/0021785 A1 | * | 2/2004 | Pshtissky et al. ............ 348/275 |

FOREIGN PATENT DOCUMENTS

JP            A 62-199555            9/1987

* cited by examiner

Primary Examiner—Rita Leykin
(74) Attorney, Agent, or Firm—Oliff & Berridge, PLC

(57) ABSTRACT

The invader detector has a fixing portion attached and fixed within a vehicle, a sensor containing portion for enclosing an ultrasonic sensor for detecting an invader into the vehicle, and an angular displacement shaft for angularly displacing the sensor containing portion. The sensor containing portion can be driven to a detection position for detecting the invader into the vehicle or a storage position.

22 Claims, 16 Drawing Sheets

INVADER DETECTOR AND CONTROLLER

The present disclosure relates to the subject matter contained in Japanese Patent Application No.2002-39470 filed on Feb. 18, 2002, which is incorporated herein by reference in its entirety.

BACKGROUND OF THE INVENTION

1. Field of the Invention

The present invention relates to an invader detector and a controller, and more particularly to an invader detector for detecting an illegal invader into a vehicle and a controller for controlling driving of the invader detector.

2. Description of the Related Art

There is a tendency that cases of theft such as vehicle theft and robbery are increasing in the number of occurrences and the occurrence rate, leading to a social problem. In recent years, various types of vehicle theft preventing devices have been proposed to prevent vehicle thefts. For example, if an illegal invader into the vehicle is detected, an alarm such as a siren is sounded or an engine start is inhibited.

In this way, if an alarm is sounded or an engine start is inhibited, it is possible to inform that a vehicle theft is being conducted or to play for time, thereby suppressing the damage to the minimum.

A method for detecting an illegal invader into a vehicle involves detecting a motion of the invader into the vehicle with ultrasonic wave by a ultrasonic sensor mounted on the vehicle, for example.

By the way, an invader detector including an ultrasonic sensor is usually mounted in a central part (e.g., near a map lamp) of a ceiling within a vehicle forward in a running direction to precisely detect an illegal invader into the vehicle. Also, the invader detector is not singly mounted within the vehicle but mounted integrally with a map lamp in the ceiling of the vehicle.

However, there has been a problem with the devices including the ultrasonic sensor that a sensor opening portion is needed. Also, the design of the vehicle is impaired because the device has a large thickness (e.g., the map lamp equipped with the ultrasonic sensor is thicker by about 20 mm than the normal map lamp).

Also, detecting performance of the invader employing the ultrasonic sensor (i.e., precision of detecting an illegal invader) is varied depending on a situation within the vehicle. For example, if the seat position is changed or a bag is placed on the seat, there is a problem that the best detecting performance might not be secured.

SUMMARY OF THE INVENTION

The present invention has been achieved in the light of the above-mentioned problems. It is an object of the invention to provide an invader detector that provides the best detecting performance without impairing the design of the vehicle and a controller for controlling driving of the invader detector. It is also another object of the invention to provide an invader detector that provides the best detecting performance even if a situation is changed within the vehicle and a controller for controlling driving of the invader detector.

To accomplish the above object, there is provided an invader detector (1) according to the invention including a fixing portion, a detecting unit, a containing portion, and a containing portion driving unit. The fixing portion is attached and fixed to a vehicle. The detecting unit detects an invader into the vehicle. The containing portion contains the detecting unit. The containing portion driving unit drives the containing portion between a detection position where the detecting unit detects the invader into the vehicle and a storage position.

With the invader detector (1), the containing portion can be freely driven between the detection position and the storage position. For example, when the security system equipped in the vehicle is operating and it is necessary to detect an invader into the vehicle, the containing portion is driven to the detection position. On the other hand, when the security system is not operating and it is not necessary to detect an invader into the vehicle, the containing portion is driven to the storage position.

Accordingly, when the security system is operating (i.e., when the normal driver or crew is left away from the vehicle), it is possible to properly detect an invader into the vehicle. On the other hand, when the security system is not operating (i.e., when the normal driver or crew is aboard and it is unnecessary to detect an invader into the vehicle), the containing portion is stored so that the design of the vehicle is not impaired.

Also, in addition to the invader detector (1), in an invader detector (2), the fixing portion is attached to a ceiling of the vehicle. The storage position is at least one of a bore defined in the ceiling and a back in the ceiling.

With the invader detector (2), the containing portion is stored in the bore defined through the ceiling and/or the back in the ceiling, for example, as shown in FIGS. 1, 11 and 15. Therefore, the containing portion is stored in a very simplified form.

Also, in addition to the invader detector (1) or the invader detector (2), an invader detector (3) further includes a detecting direction changing unit for changing a detecting direction of the detecting unit.

With the invader detector (3), the containing portion is not only driven but also the detecting direction of the detecting unit is changed. Therefore, the invader into the vehicle can be precisely detected.

Also, in addition to any one of the invader detectors (1) to (3), in an invader detector (4), the detecting unit includes a transmission unit and a reception unit, which are contained in the containing portion. The invader detector (4) further includes an interval changing unit for changing an interval between the transmission unit and the reception unit.

With the invader detector (4), the interval between the transmission unit and the reception unit (i.e., width over them) can be changed. Therefore, it is possible to finely adjust the detecting state where the invader into the vehicle is detected.

Also, in addition to any one of the invader detectors (1) to (4), in an invader detector (5), the containing portion driving unit includes a first mechanism for angularly displacing the containing portion around an angular displacement shaft. The first mechanism anguraly displaces the containing portion around the angular displacement shaft to drive the containing portion between the detection position and the storage position.

With the invader detector (5), the containing portion is angularly displaced around the angular displacement shaft, for example, as shown in FIGS. 1 to 4 and FIGS. 11 to 14. Therefore, it is possible to appropriately adjust the position of the containing portion on the vertical plane.

Also, in addition to the invader detector (5), in an invader detector (6), the containing portion driving unit includes a second mechanism for rotating the containing portion by at least half-turn around a rotation shaft.

With the invader detector (6), the containing portion is rotated by at least half-turn around the rotation shaft, for example, as shown in FIGS. 12 and 13. Therefore, the detecting unit (e.g., ultrasonic sensor) contained in the containing portion is directed toward the vehicle without occupying large space.

Also, in addition to any one of the invader detectors (1) to (4), in an invader detector (7), the containing portion driving unit includes a third mechanism for moving the containing portion vertically, when the fixing portion is attached and fixed to a predetermined position in the vehicle. The third mechanism drives the containing portion between the detecting portion and the storage position when the third mechanism is moved vertically.

With the invader detector (7), the containing portion is moved vertically, for example, as shown in FIGS. 15 to 17. Therefore, it is possible to appropriately adjust the position of the containing portion on the vertical plane.

Also, in addition to any one of the invader detectors (1) to (7), an invader detector (8) further including a first control unit, which controls the containing portion driving unit to drive the containing portion to the detecting position when a first condition is satisfied.

With the invader detector (8), if the first predetermined condition is met (e.g. at a timing when the security system is initiated), the containing portion is automatically driven to the detection position. Therefore, the security is enhanced.

Also, in addition to any one of the invader detectors (1) to (8), an invader detector (9) further includes a second control unit, which controls the containing portion driving unit to drive the containing portion to the storage position when a second condition is satisfied.

With the invader detector (9), if the second predetermined condition is met (e.g. at a timing when the security system is ended), the containing portion is automatically driven to the detection position. Therefore, the user can use the invader detector is very easily.

Also, in addition to the invader detector (3), an invader detector (10) further includes a third control unit for controlling at least one of the containing portion driving unit and the detecting direction changing unit to retrieve state of at least one of the containing portion and the detecting unit, which satisfies a third condition. The third control unit controls the at least one of the containing portion driving unit and the detecting direction changing unit based on the retrieval result to satisfy the third condition.

Also, in addition to the invader detector (4), an invader detector (11) further includes a third control unit for controlling at least one of the containing portion driving unit and the interval changing unit to retrieve state of at least one of the containing portion and the detecting unit, which satisfies a third condition. The third control unit controls the at least one of the containing portion driving unit and the interval changing unit based on the retrieval result to satisfy the third condition.

Also, in addition to any one of the invader detectors (10) and (11), in an invader detector (12), the third condition involves that sum of detection level of a reflection wave reflected at a forward portion in a running direction in the vehicle and detection level a reflection wave reflected at a rearward portion in the running direction in the vehicle each is the maximum detection level.

Also, in addition to any one of the invader detectors (10) and (11), in an invader detector (13), the third predetermined condition involves that detection level of a reflection wave reflected at a forward portion in a running direction in the vehicle is the maximum detection level.

Also, in addition to any one of the invader detectors (10) and (11), in an invader detector (14), the third predetermined condition involves that detection level of a reflection wave reflected at a rearward portion in a running direction in the vehicle is the maximum detection level.

With the invader detectors (10) to (14), the state of the containing portion and/or the detecting unit to meet the third predetermined condition (e.g., the position of the containing portion or the detecting direction of the detecting unit) is retrieved. The containing portion is driven or the detecting direction of the detecting unit is changed on the basis of its retrieval result. That is, the state of the containing portion and/or the detecting unit is adjusted in accordance with a situation inside the vehicle (e.g., a change in the seat position).

Accordingly, the containing portion and/or the detecting unit is adjusted to meet the third predetermined condition, without being affected by the situation inside the vehicle.

The predetermined condition involves any one of the following items (i), (ii) and (iii).

(i) Detecting a reflected wave from the front portion (e.g., front seat) of the vehicle in the running direction and a reflected wave from the rear portion (e.g., rear seat) of the vehicle in the running direction so that sum of detection levels of both reflected waves is the maximum detection level.

Thereby, it is possible to detect an invader into the vehicle in very balanced state as a whole.

(ii) Detecting a reflected wave from the front portion (e.g., front seat) of the vehicle in the running direction which has the maximum detection level.

Thereby, emphasis is placed on detecting an invader into the front portion of the vehicle in the running direction. For example, when the vehicle is parked in such a manner that it is difficult to invade into the rear portion of the vehicle in the running direction, and only possible to invade into the front portion of the vehicle in the running direction, this condition is very effective.

(iii) Detecting a reflected wave from the rear portion (e.g., rear seat) of the vehicle in the running direction which has the maximum detection level.

Thereby, emphasis is placed on detecting an invader into the rear portion of the vehicle in the running direction. For example, when the vehicle is parked in such a manner that it is difficult to invade into the front portion of the vehicle in the running direction, and only possible to invade into the rear portion of the vehicle in the running direction, this condition is very effective.

Also, in addition to any one of the invader detectors (10) to (14), in an invader detector (15), when the containing portion is driven to the detection position, the third control unit conduct the control.

With the invader detector (15), if the containing portion is driven to the detection position (e.g., at a timing when the security system is initiated), the containing portion is driven or the detecting direction of the detecting unit is changed to meet the third predetermined condition.

That is, the state of the containing portion and/or the detecting unit is automatically adjusted in accordance with a situation inside the vehicle (e.g., a change in the seat position). Therefore, the user can use the invader detector is very easily.

Also, a controller (1) according to the invention, controls any one of the invader detectors (1) to (7). The controller (1)

includes a first control unit, which controls the containing portion driving unit to drive the containing portion to the detecting position when a first condition is satisfied.

With the controller (1), if the first predetermined condition is met (e.g. at a timing when the security system is initiated), the containing portion is automatically driven to the detection position. Therefore, the security is enhanced.

Also, a controller (2) according to the invention, controls any one of the invader detectors (1) to (7). The controller (2) includes a second control unit, which controls the containing portion driving unit to drive the containing portion to the storage position when a second condition is satisfied.

With the controller (2), if the second predetermined condition is met (e.g. at a timing when the security system is ended), the containing portion is automatically driven to the storage position. Therefore, the user can use the invader detector very easily.

Also, a controller (3) according to the invention, controls any one of the invader detectors (1) to (7). The controller (3) includes a third control unit for controlling at least one of the containing portion driving unit, the detecting direction changing unit, and the interval changing unit to retrieve state of at least one of the containing portion and the detecting unit, which satisfies a third condition. The third control unit controls the at least one of the containing portion driving unit, the detecting direction changing unit, and the interval changing unit based on the retrieval result to satisfy the third condition.

Also, in addition to the controller (3), in a controller (4), the third condition involves that sum of detection level of a reflection wave reflected at a forward portion in a running direction in the vehicle and detection level of a reflection wave reflected at a rearward portion in the running direction in the vehicle each is the maximum detection level.

Also, in addition to the controller (3), in a controller (5), the third predetermined condition involves that detection level of a reflection wave reflected at a forward portion in a running direction in the vehicle is the maximum detection level.

Also, in addition to the controller (3), in a controller (6), the third predetermined condition involves that detection level of a reflection wave reflected at a rearward portion in a running direction in the vehicle is the maximum detection level.

With the controllers (3) to (6), the state of the containing portion and/or the detecting unit (e.g., position of the containing portion or the detecting direction of the detecting unit) is retrieved, and the containing portion is driven or the detecting direction of the detecting unit is changed on the basis of the retrieval result. That is, the state of the containing portion and/or the detecting unit is adjusted in accordance with a situation inside the vehicle (e.g., a change in the seat position).

Accordingly, the containing portion and/or the detecting unit is adjusted to meet the third predetermined condition without being affected by the situation inside the vehicle.

Also, in addition to any one of the controllers (3) to (6), in a controller (7), when the containing portion is driven to the detection position, the third control unit conduct the control.

With the controller (7), if the containing portion is driven to the detection position (e.g., at a timing when the security system is initiated), the containing portion is driven or the detecting direction of the detecting unit is changed to meet the third predetermined condition.

Namely, the state of the containing portion and/or the detecting unit is automatically adjusted in accordance with a situation inside the vehicle (e.g., a change in the seat position). Therefore, the user can use the invader detector very easily.

DETAILED DESCRIPTION OF THE PREFERRED EMBODIMENTS

Figure 1:
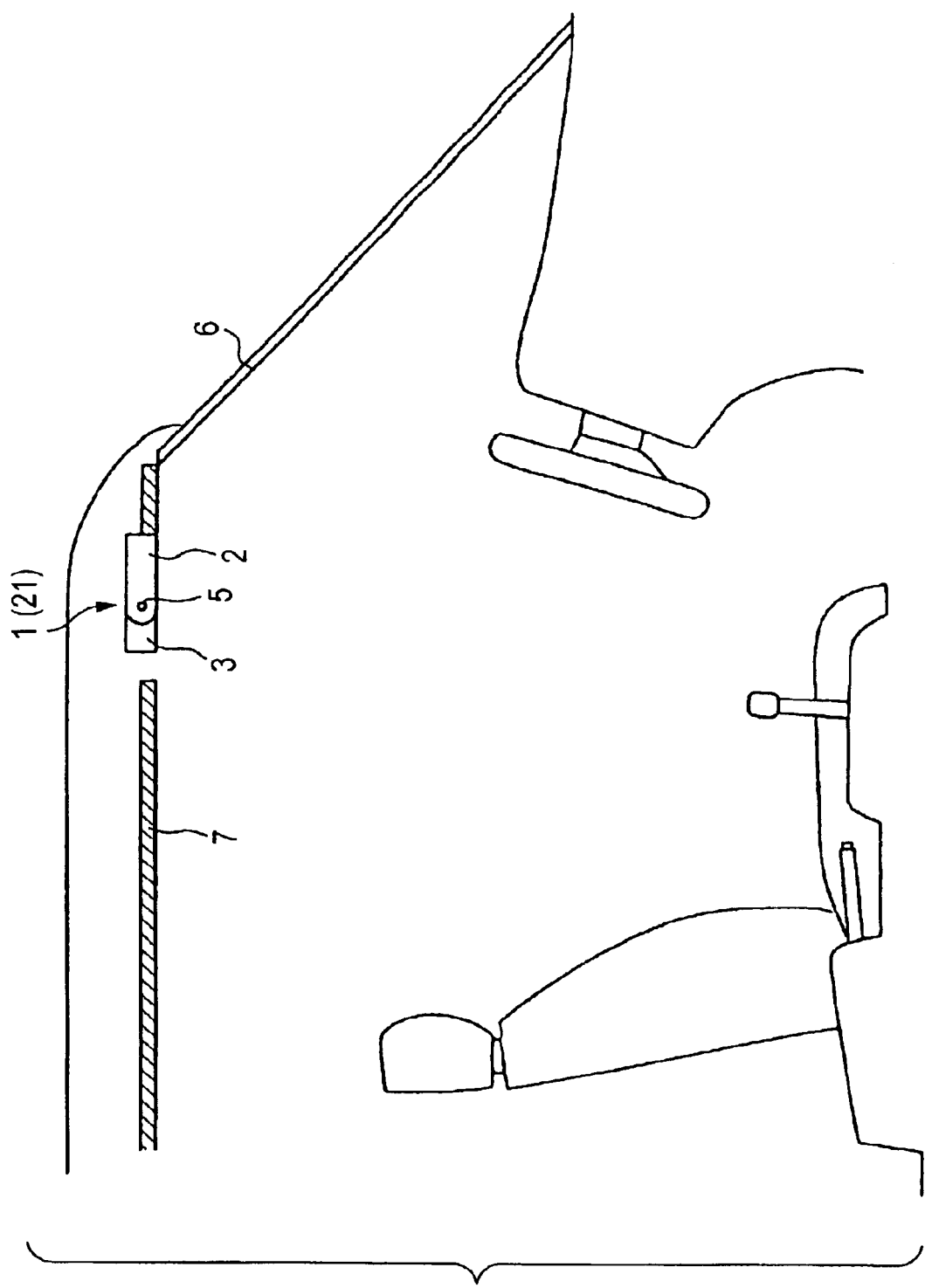
FIG. 1 is a partial cross-sectional side view showing a state where an invader detector according to an embodiment (1) of the present invention is mounted within a vehicle.
Figure 2:
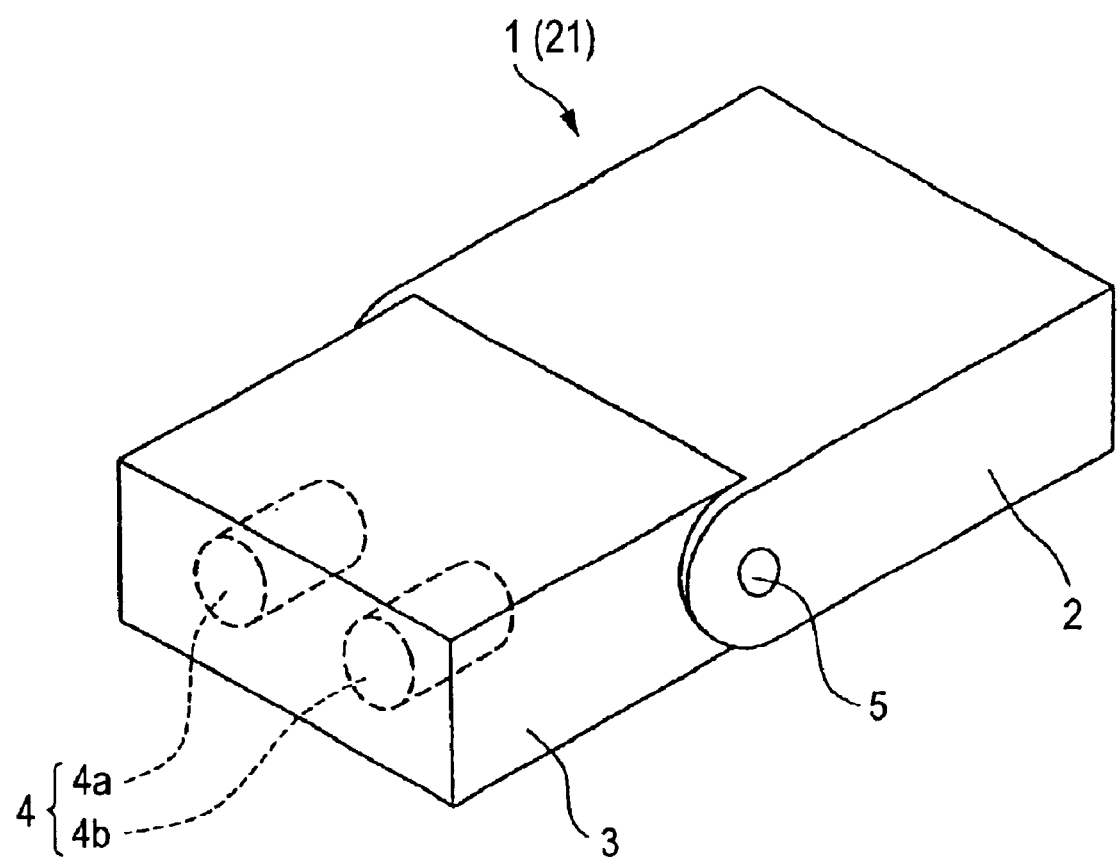
FIG. 2 is a perspective view schematically showing the invader detector according to the embodiment (1).

The preferred embodiments of an invader detector and a controller according to the present invention will be described below with reference to the accompanying drawings. FIG. 1 is a partial cross-sectional side view showing a state where an invader detector according to an embodiment (1) is mounted on a vehicle. FIG. 2 is a perspective view schematically showing the invader detector according to the embodiment (1).

Figure 3:
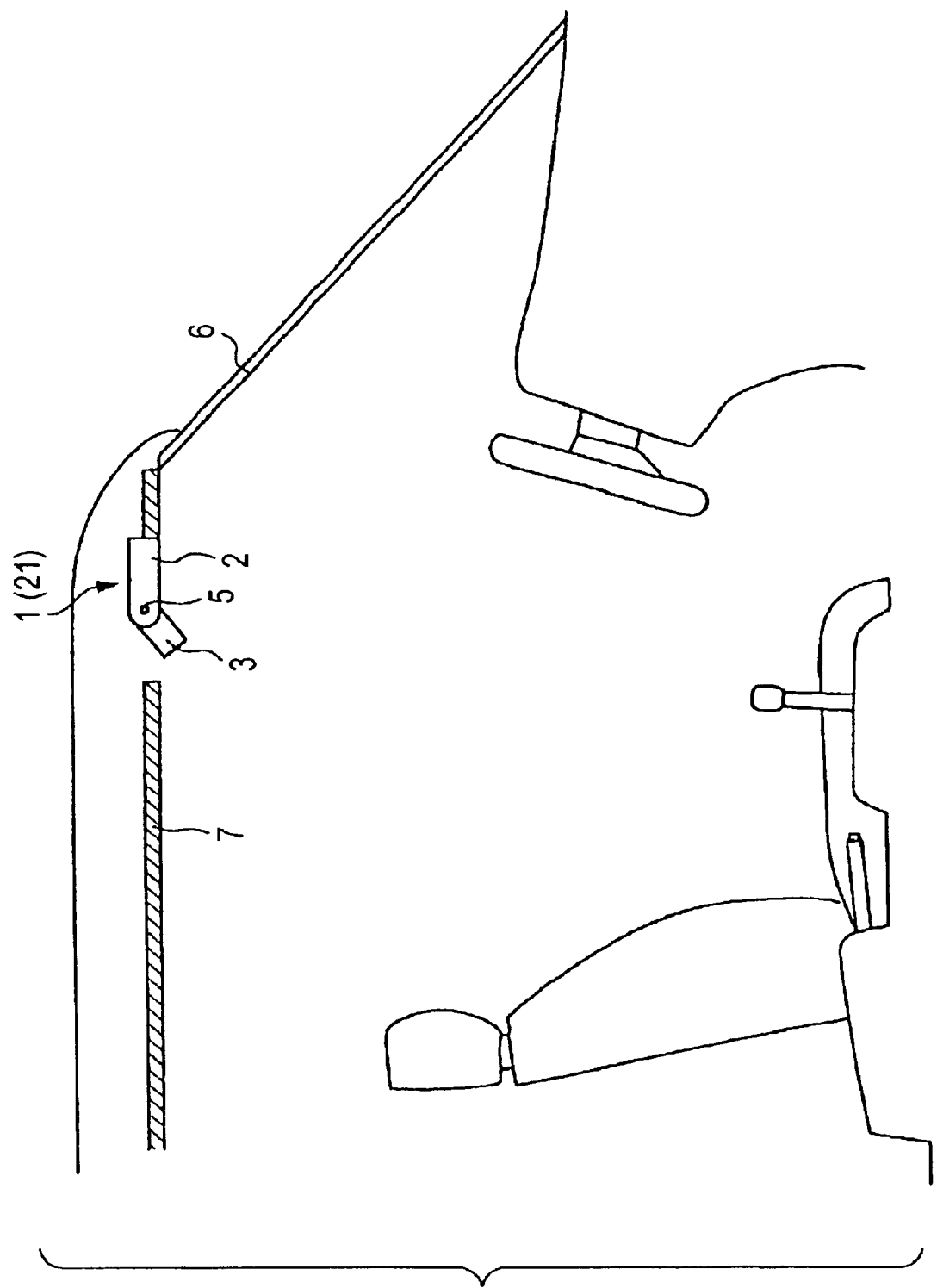
FIG. 3 is a partial cross-sectional side view showing a state where the invader detector according to the embodiment (1) is mounted within the vehicle.
Figure 4:
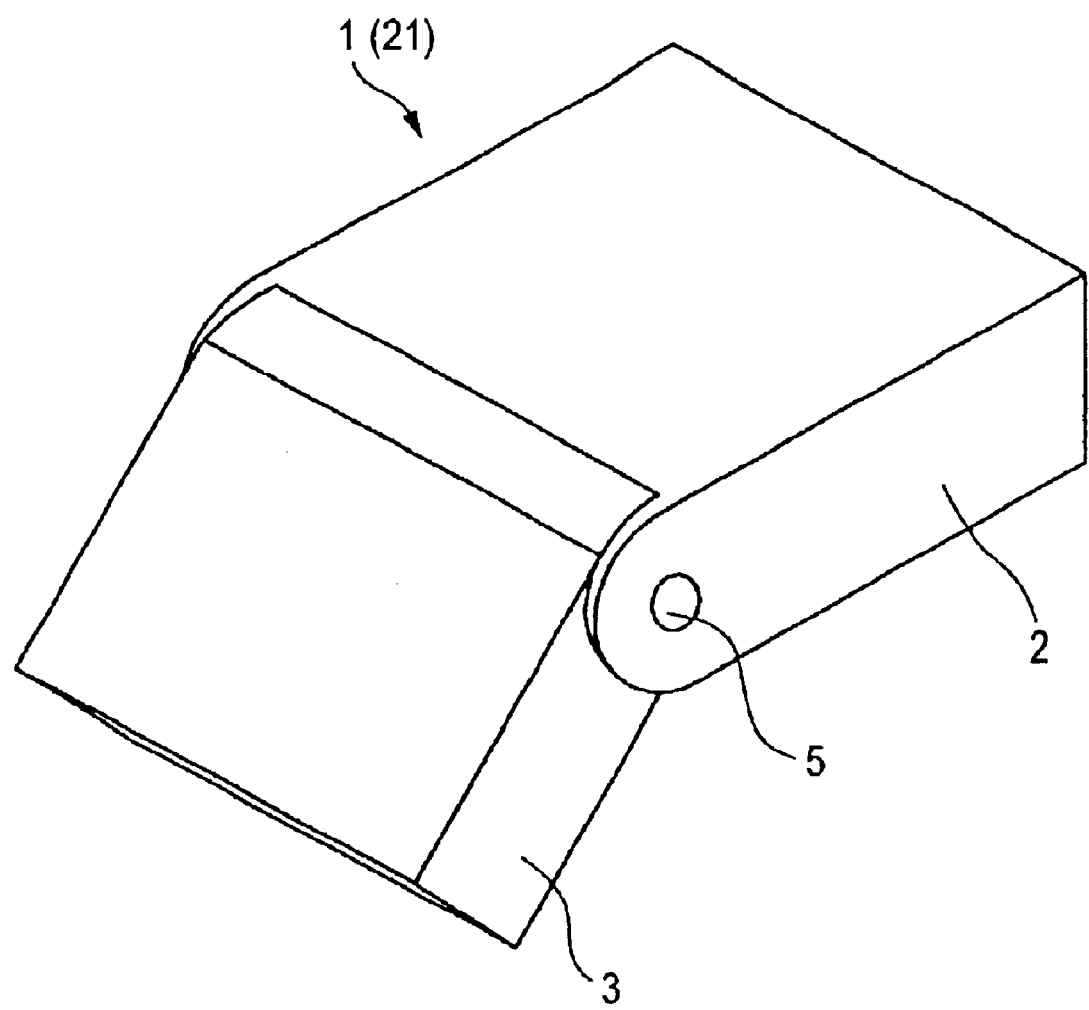
FIG. 4 is a perspective view schematically showing the invader detector according to the embodiment (1).

In the figures, numeral 1 denotes the invader detector. The invader detector 1 includes a fixing portion 2 attached and fixed to a central part of a ceiling 7 around a front glass 6 forward in the running direction, a sensor containing portion 3 for containing a ultrasonic sensor 4, and an angular displacement shaft 5 serving as a shaft for angularly displacing the sensor containing portion 3. FIGS. 3 and 4 are views showing the states where the sensor containing portion 3 is angularly displaced around the angular displacement shaft.

The ultrasonic sensor 4 includes a transmission section 4a for transmitting an ultrasonic wave, and a receiving section 4b for receiving a reflected wave from an obstacle. Thus, it is determined whether or not there is an illegal invasion into the vehicle on the basis of a situation of receiving ultrasonic wave at the receiving section 4b.

Figure 5:
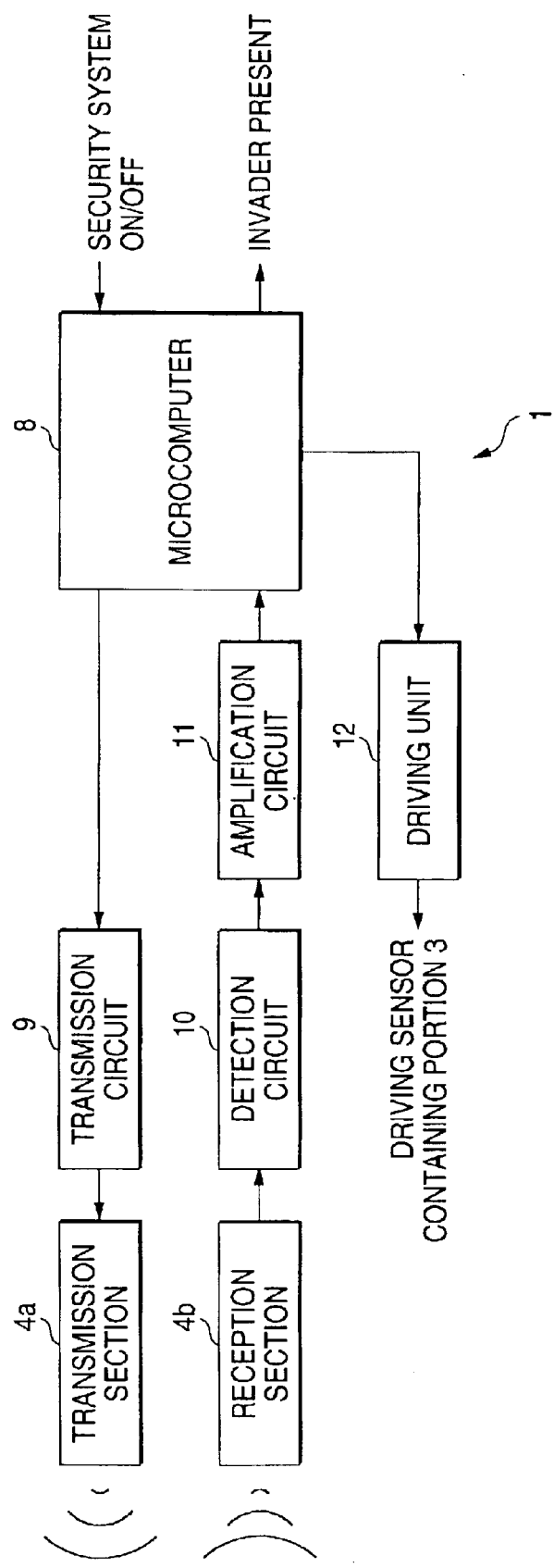
FIG. 5 is a block diagram showing an electrical configuration of the invader detector according to the embodiment (1).

FIG. 5 is a block diagram showing an electrical configuration of the invader detector 1 according to the embodiment (1). The invader detector 1 includes a microcomputer 8, a transmission circuit 9, a detection circuit 10, an amplification circuit 11, and a driving unit 12 for driving the angular displacement of the sensor containing portion 3 around the angular displacement shaft 5.

The microcomputer 8 makes the transmission section 4a to transmit an ultrasonic wave via the transmission circuit 9, and acquires a reception wave received at the reception section 4b via the detection circuit 10 and the amplification circuit 11. Also, the microcomputer 8 controls the driving of the driving unit 12.

Further, the microcomputer 8 acquires a signal indicating start/end of operating a security system from a security apparatus equipped in the vehicle and informs the security apparatus of an illegal invasion into the vehicle.

Figure 6:
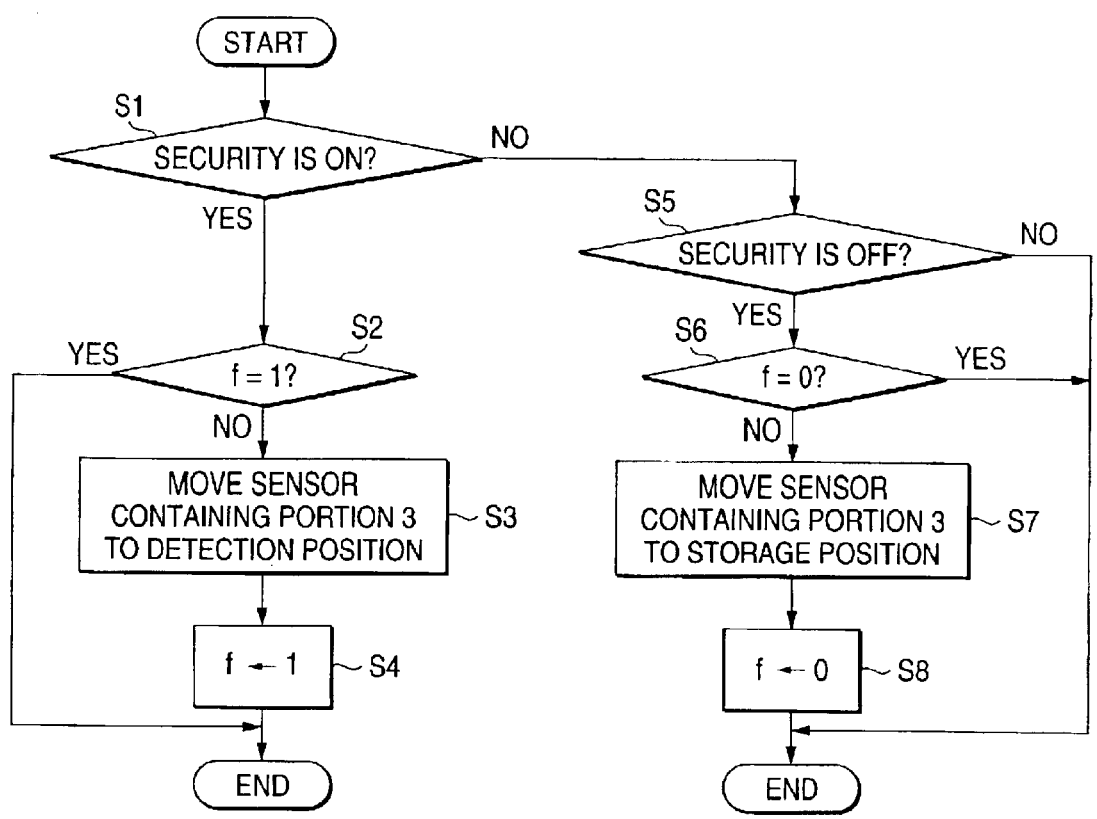
FIG. 6 is a flowchart showing the processing operation of a microcomputer in the invader detector according to the embodiment (1).

Referring to a flowchart of FIG. 6, a processing operation (1) of the microcomputer 8 in the invader detector 1 according to the embodiment (1) will be described below. First of all, it is determined whether or not a signal indicating the start of operating the security system is acquired from the security apparatus (step S1). When the signal is acquired, it is determined whether or not a flag f indicating that the sensor containing portion 3 is driven to a detection position is 1 (step S2).

When the flag f is not 1 (i.e., the sensor containing portion 3 is not yet driven to the detection position), the sensor containing portion 3 is angularly displaced around the angular displacement shaft 5 by controlling the driving of the driving unit 12. Therefore, the sensor containing portion 3 is driven to the preset detection position (step S3), as shown in FIGS. 3 and 4. Then, the flag f is set to 1 (step S4).

On the other hand, if the flag f is 1 (i.e., the sensor containing portion 3 is already driven to the detection position) at step S2, the processing operation (1) is directly ended because of no need for controlling the driving of the driving unit 12.

At step S1, when the signal indicating that the operation of the security system is started is not acquired, it is determined whether or not a signal indicating that the operation of the security system is ended is acquired (step S5). If so, it is determined whether or not the flag f is 0 (step S6).

When the flag f is not 0 (i.e., the sensor containing portion 3 is at the detection position and not yet stored), the sensor containing portion 3 is angularly displaced around the angular displacement shaft 5 by controlling the driving of the driving unit 12. Therefore, the sensor containing portion 3 is driven to the storage position (i.e., a bore portion defined in the ceiling, and the back of the ceiling) (step S7). Then, the flag f is made 0 (step S8).

On the other hand, at step S6, if the flag f is 0 (i.e., the sensor containing portion 3 is already stored), the processing operation (1) is directly ended, because of no need for controlling the driving of the driving unit 12. Also, if the signal indicating that the operation of the security system is ended is not acquired at step 5, the processing operation (1) is directly ended.

With the invader detector according to the embodiment (1), when the security system equipped in the vehicle is operating and it is required to detect an invader into the vehicle, the sensor containing portion 3 is driven to the detection position. On the other hand when the security system is not operating and it is not required to detect an invader into the vehicle, the sensor containing portion 3 is driven to the storage position.

Accordingly, when the security system is operating (i.e., when the normal driver or crew is left away from the vehicle), it is possible to properly detect an invader into the vehicle. On the other hand, when the security system is not operating (i.e., when the normal driver or crew is aboard and it is unnecessary to detect an invader into the vehicle), the sensor containing portion 3 is stored so that the design of the vehicle is not impaired.

Figure 7:
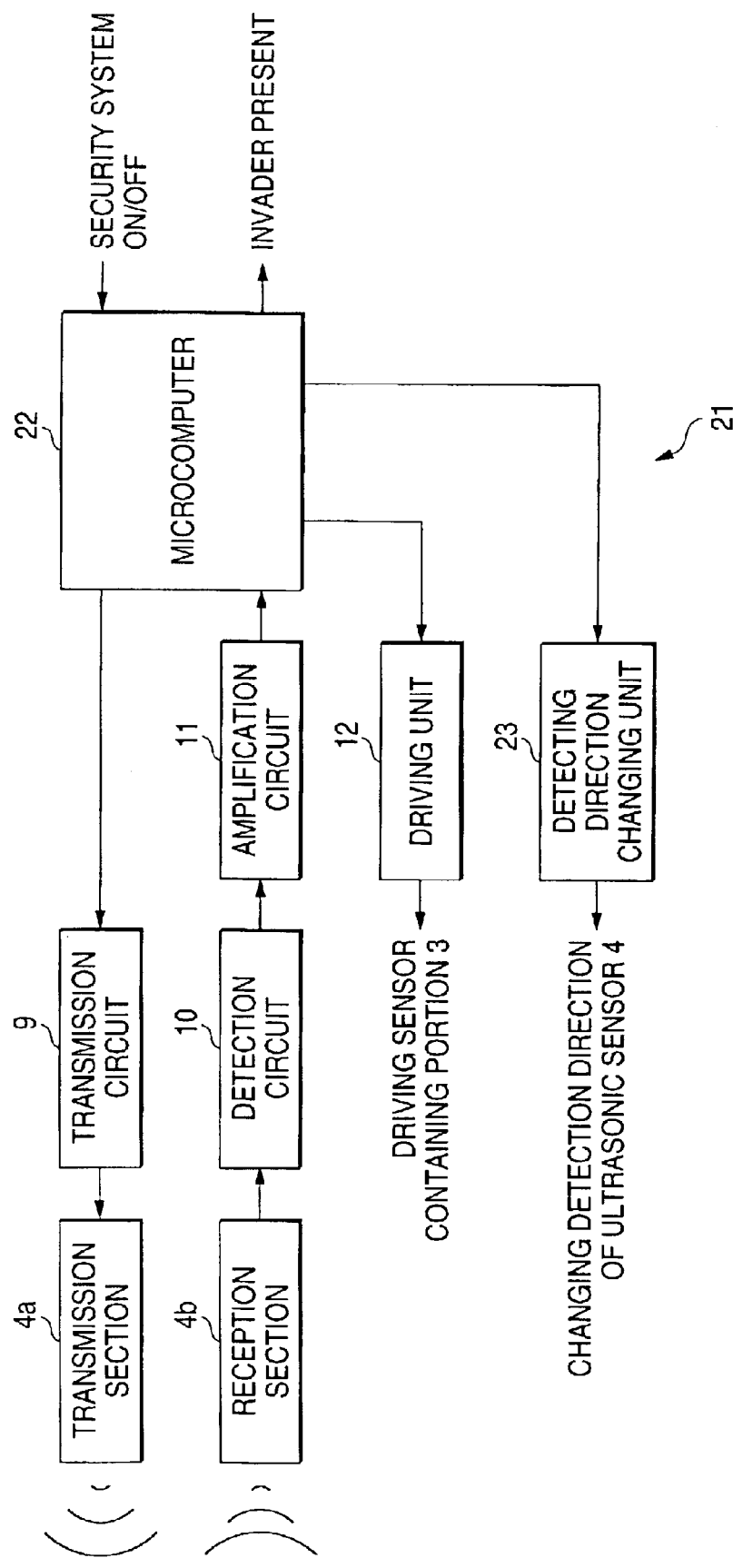
FIG. 7 is a block diagram showing an electrical configuration of an invader detector according to an embodiment (2).

FIG. 7 is a block diagram showing an electrical configuration of an invader detector according to an embodiment (2) of the invention. Here, the same or like parts are designated by the same numerals as in the invader detector 1 of FIG. 5, and the description of those same parts is omitted. The appearance of the invader detector according to the embodiment (2) and the mounting method onto the vehicle are similar to those of the invader detector 1 as shown in FIGS. 1 to 4, and the description of them is also omitted.

Figure 8:
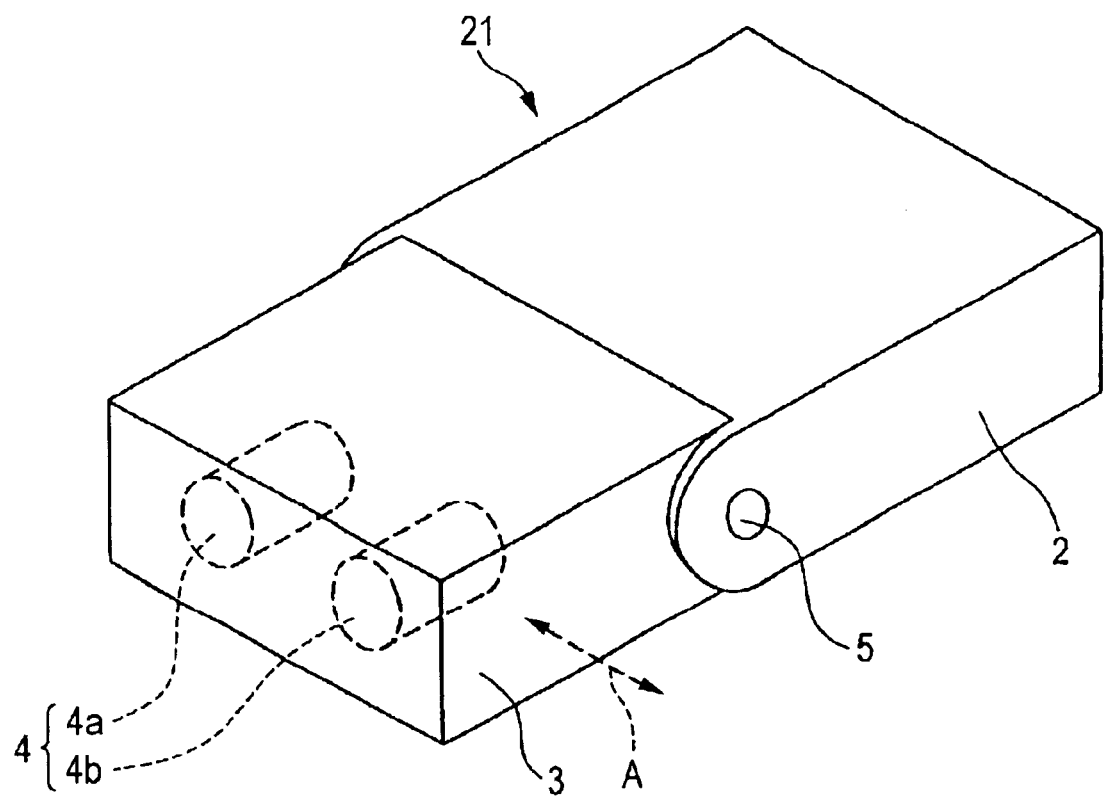
FIG. 8 is a perspective view schematically showing the invader detector according to the embodiment (2).

In FIG. 7, numeral 21 denotes the invader detector. The invader detector 21 includes a microcomputer 22, a transmission circuit 9, a detection circuit 10, an amplification circuit 11, and a driving unit 12 and a detecting direction changing unit 23 for changing a detecting direction of the ultrasonic sensor 4. The detecting direction changing unit 23 is configured such that the ultrasonic sensor 4 is moved is a direction of an arrow A orthogonal to a driving direction (i.e., angular displacement direction) of the sensor containing portion 3, as shown in FIG. 8.

The microcomputer 22 makes the transmission section 4a to transmit a ultrasonic wave via the transmission circuit 9, and acquire a reception wave received at the receiving section 4b via the detection circuit 10 and the amplification circuit 11. Also, the microcomputer 22 controls the driving of the driving unit 12 and the detecting direction changing unit 23.

Further, the microcomputer 22 acquires a signal indicating start/end of operating a security system from a security apparatus equipped in the vehicle and informs the security apparatus of an illegal invasion into the vehicle.

Figure 9:
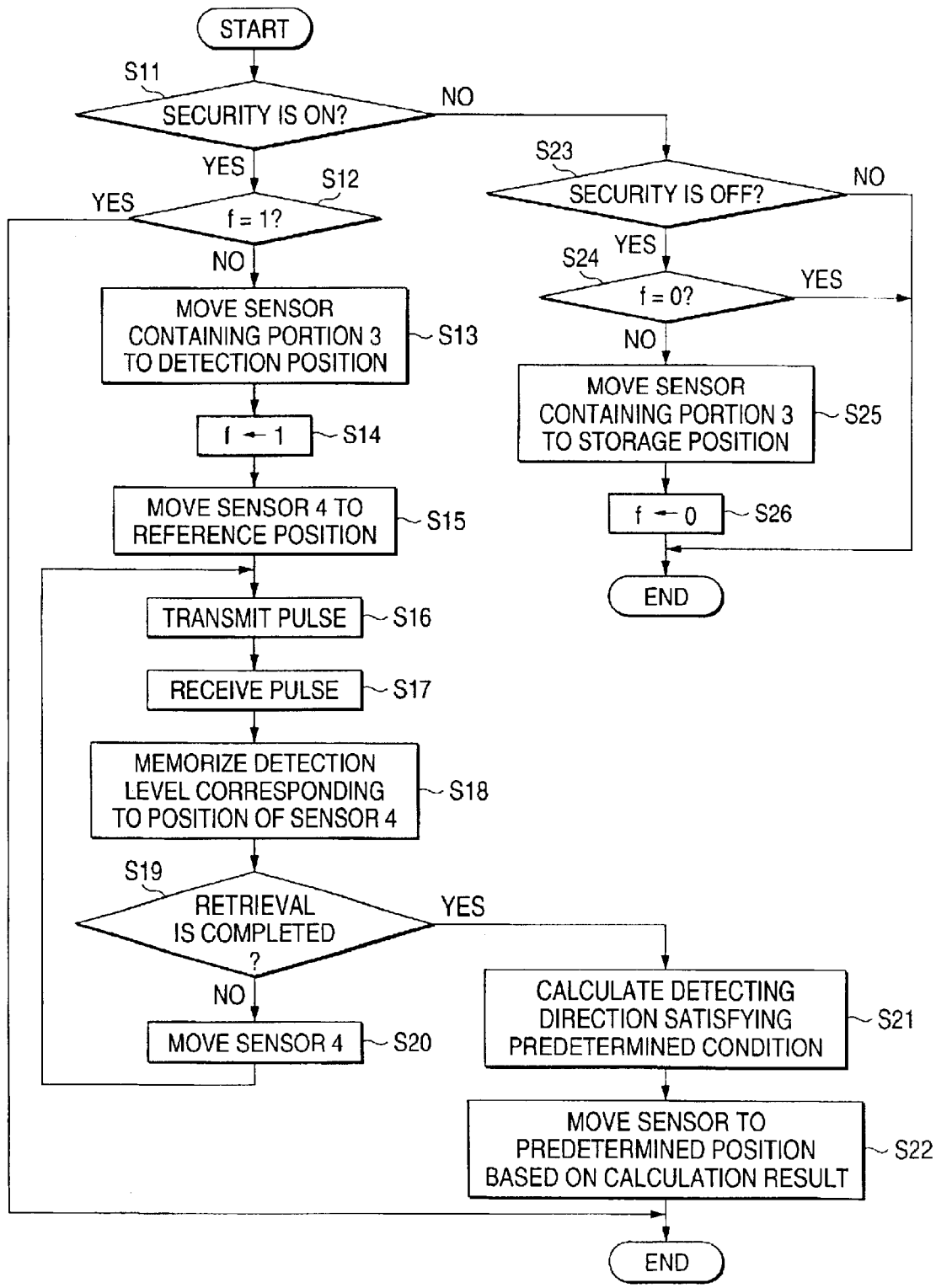
FIG. 9 is a flowchart showing the processing operation of a microcomputer in the invader detector according to the embodiment (2).

Referring to a flowchart of FIG. 9, a processing operation (2), which the microcomputer 22 in the invader detector 21 according to the embodiment (2) executes, will be described below. First of all, it is determined whether or not a signal indicating the start of operating the security system is acquired from the security apparatus (step S11). When the signal is acquired, it is determined whether or not a flag f indicating that the sensor containing portion 3 is driven to the detection position is 1 (step S12).

When the flag f is not 1 (i.e., the sensor containing portion 3 is not yet driven to the detection position), the sensor containing portion 3 is angularly displaced around the angular displacement shaft 5 by controlling the driving of the driving unit 12. Therefore, the sensor containing portion 3 is driven to the preset detection position (step S13), as shown in FIGS. 3 and 4. Then, the flag f is set to 1 (step S14), and the operation proceeds to step S15.

On one hand, when the flag f is 1 (i.e., the sensor containing portion 3 is already driven to the detection position) at step S12, the processing operation (2) is directly ended, because of no need for controlling the driving of the driving unit 12.

At step S15, the ultrasonic sensor 4 is driven to the reference position by controlling the detecting direction changing unit 23. Then, a pulse is transmitted from the transmission section 4a by controlling the transmission circuit 9 (step S16.). Thereafter, a reception wave is acquired via the detection circuit 10 and the amplification circuit 11 from the receiving section 4b, which receives the pulse reflected from an obstacle (e.g., a front seat) in the vehicle (step S17). Data regarding the detection level of the reception wave acquired is stored in a memory (not shown) within the microcomputer 22 in correspondence to the setting position of the ultrasonic sensor 4 (step S18).

Figure 10A:
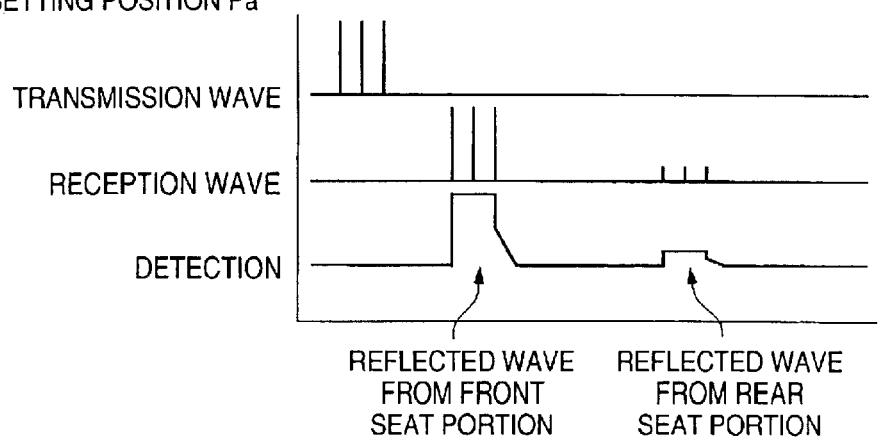
FIGS. 10A to 10C are graphs showing the relationship between an obstacle and the detection level of received wave at the setting positions of the ultrasonic sensor.
Figure 10B:
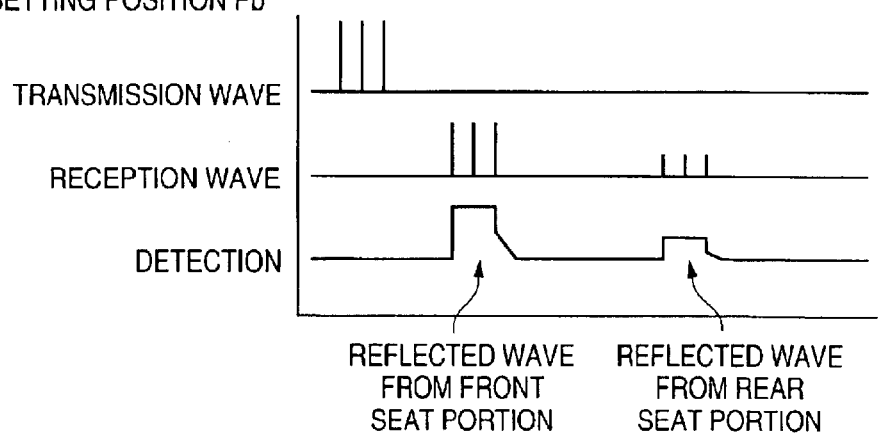
Figure 10C:
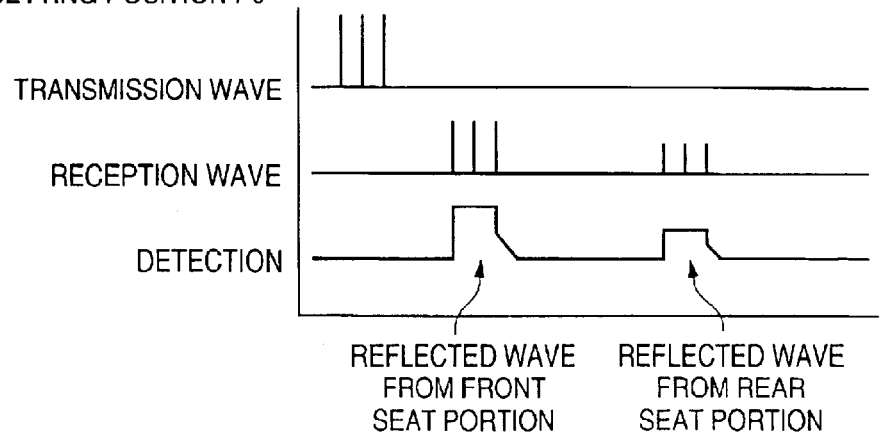

FIGS. 10A to 10C are charts representing a relationship between the obstacle (here, front seat and rear seat) and the detection level of reception wave at the setting positions Pa to Pc of the ultrasonic sensor 4, respectively. Though the maximum detection level of reflected wave from the front seat takes place at the setting position Pa, the detection level of reflected wave from the rear seat is smaller at this position. Also, though the maximum detection level of reflected wave from the rear seat takes place at the setting position Pc, the detection level of reflected wave from the front seat is smaller at this position.

Then, it is determined whether or not retrieval for the detection performance of the ultrasonic sensor 4 is made (i.e., retrieval is ended) over an entire movable range of the ultrasonic sensor 4 (step S19). If the retrieval is not ended, the ultrasonic sensor 4 is driven by a predetermined amount by controlling the detecting direction changing unit 23 (step S20). Thereafter, the operation returns to step S16.

On the other hand, if the retrieval is ended, the position of the ultrasonic sensor 4 satisfying a predetermined condition is calculated on the basis of the stored content of the memory (step S21). Then, the ultrasonic sensor 4 is moved by controlling the detecting direction changing unit 23 on the basis of the calculation result (step S22). The predetermined condition involves any one of the following items (i), (ii) and (iii).

(i) Detecting a reflected wave from the front portion (e.g., front seat) of the vehicle in the running direction and a reflected wave from the rear portion (e.g., rear seat) of the vehicle in the running direction so that sum of detection levels of both reflected waves has the maximum detection level.

Thereby, it is possible to detect an invader into the vehicle in very balanced state as a whole. Among the setting positions Pa to Pc (FIG. 10), the setting position Pb satisfies this condition most suitably.

(ii) Detecting a reflected wave, which has the maximum detection level, from the front portion (e.g., front seat) of the vehicle in the running direction.

Thereby, emphasis is placed on detecting an invader into the front portion of the vehicle in the running direction. For example, when the vehicle is parked in such a manner that it is difficult to invade into the rear portion of the vehicle in the running direction and only possible to invade into the front portion of the vehicle in the running direction, this condition is very effective. Among the setting positions Pa to Pc (FIG. 10), the setting position Pa satisfies this condition most suitably.

(iii) Detecting a reflected wave, which has the maximum detection level, from the rear portion (e.g., rear seat) of the vehicle in the running direction.

Thereby, emphasis is placed on detecting an invader into the rear portion of the vehicle in the running direction. For example, when the vehicle is parked in such a manner that it is difficult to invade into the front portion of the vehicle in the running direction and only possible to invade into the rear portion of the vehicle in the running direction, this condition is very effective. Among the setting positions Pa to Pc (FIG. 10), the setting position Pc satisfies this condition most suitably.

By the way, at step S11, if the signal indicating that the operation of the security system is started is not acquired, it is determined whether or not a signal indicating that the operation of the security system is ended is acquired (step S23). If so, it is determined whether or not the flag f is 0 (step S24).

If the flag f is not 0 (i.e., the sensor containing portion 3 is at the detection position and not yet stored), the sensor containing portion 3 is angularly displaced around the angular displacement shaft 5 by controlling the driving of the driving unit 12. Therefore, the sensor containing portion 3 is driven to the storage position (i.e., bore portion formed in the ceiling 7, and the back of the ceiling) (step S25), as shown in FIGS. 1 and 2. Then, the flag f is set to 0 (step S26).

On the other hand, at step S24, if the flag f is 0 (i.e., the sensor containing portion 3 is already stored), the processing operation (2) is directly ended, because of no need for controlling the driving of the driving unit 12. Also, when it is determined at step 23 that the signal indicating that the operation of the security system is ended is not acquired, the processing operation (2) is also directly ended.

With the invader detector according to the embodiment (2), when the security system equipped in the vehicle is operating and it is required to detect an invader into the vehicle, the sensor containing portion 3 is driven to the detection position. On the other hand, when the security system is not operating and it is not required to detect an invader into the vehicle, the sensor containing portion 3 is driven to the storage position.

Accordingly, when the security system is operating (i.e., when the normal driver or crew is left away from the vehicle), it is possible to properly detect an invader into the vehicle. On the other hand, when the security system is not operating (i.e., when the normal driver or crew is aboard and it is unnecessary to detect an invader into the vehicle), the sensor containing portion 3 is stored so that the design of the vehicle is not impaired.

Moreover, with the invader detector according to the embodiment (2), the setting position of the ultrasonic sensor 4 satisfying the predetermined condition is retrieved and the detecting direction of the ultrasonic sensor 4 can be changed on the basis of its retrieval result. Namely, the detecting direction of the ultrasonic sensor 4 can be adjusted in accordance with a situation inside the vehicle (e.g., a change in the seat position).

Also, with the invader detector according to the embodiment (2), the setting position of the ultrasonic sensor 4 can be adjusted by controlling the detecting direction changing unit 23 to secure the best detecting performance suitable for a situation inside the vehicle. However, with the invader detector according to another embodiment of the invention, the position of the sensor containing portion 3 may be adjusted by controlling the driving unit 12. Furthermore, with the invader detector according to a further embodiment of the invention, the ultrasonic sensor 4 may be made to widths of the transmission section 4a and the receiving section 4b adjustable. Whereby, the position of the sensor containing portion 3 is adjusted with the width.

Also, with the invader detector according to the embodiment (1) or (2), the sensor containing portion 3 is angularly displaced around the angular displacement shaft 5. However, the invader detector is not limited to the above constitutions. The invader detector as described below and shown in FIGS. 11 to 17 may be employed.

Figure 11:
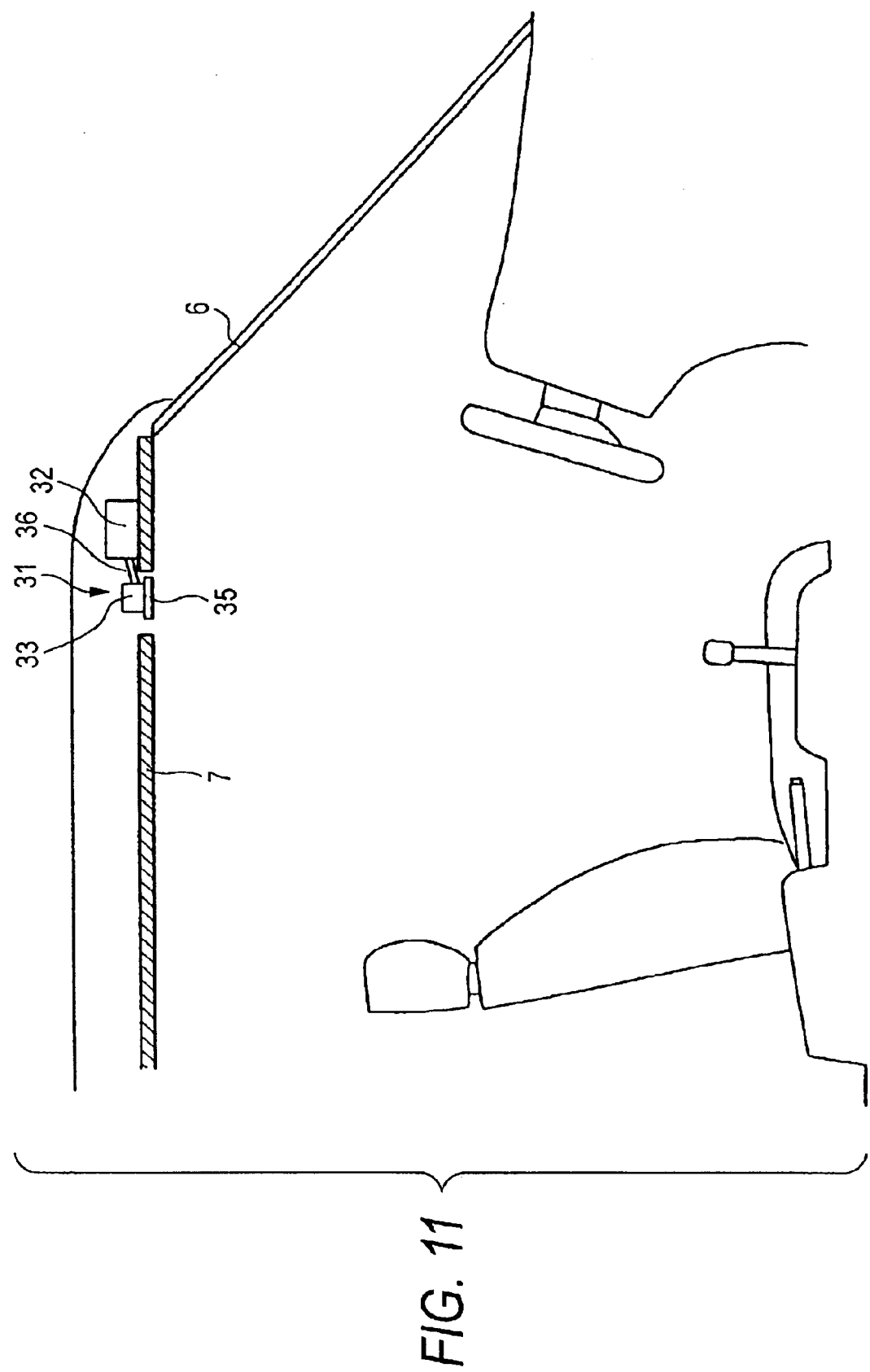
FIG. 11 is a partial cross-sectional side view showing a state where an invader detector according to an embodiment (3) is mounted within the vehicle.
Figure 12:
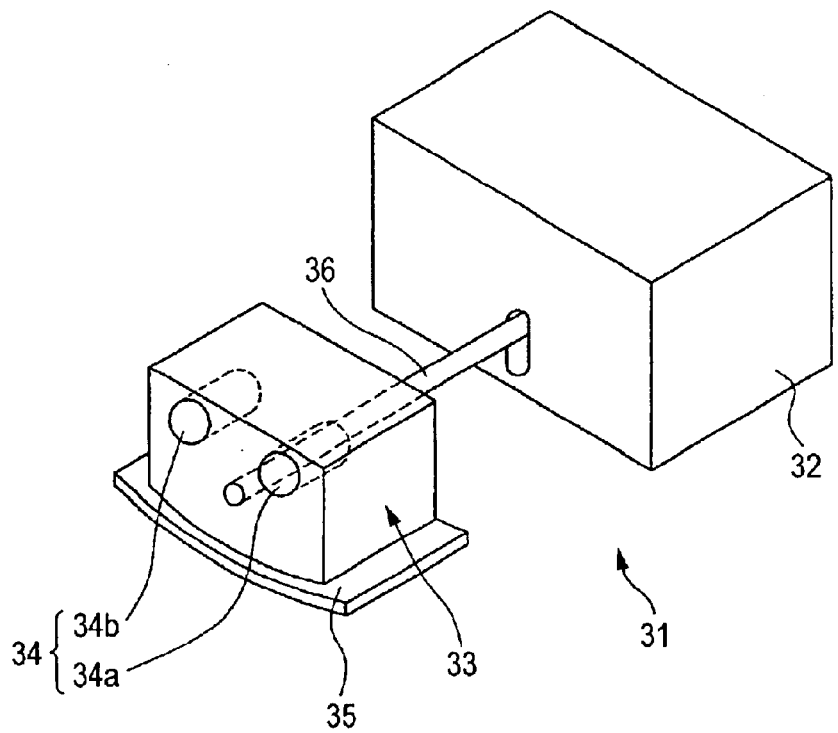
FIG. 12 is a perspective view schematically showing the invader detector according to the embodiment (3).

FIG. 11 is a partial cross-sectional side view showing a state where an invader detector according to an embodiment (3) is mounted on the vehicle. FIG. 12 is a perspective view schematically showing the invader detector according to the embodiment (3).

Figure 13:
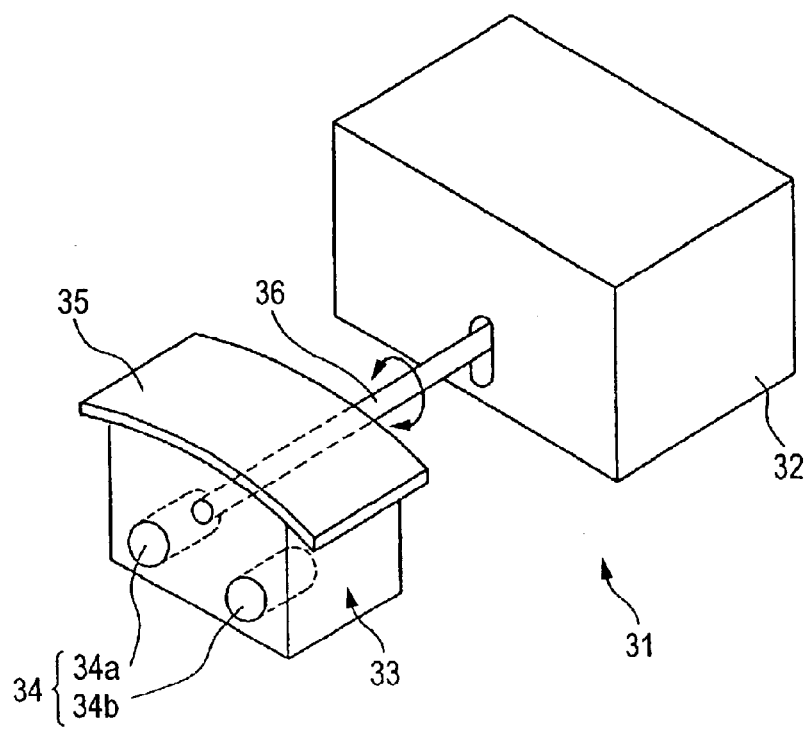
FIG. 13 is a perspective view schematically showing the invader detector according to the embodiment (3).

In the figures, numeral 31 denotes the invader detector. The invader detector 31 includes a fixing portion 32 attached and fixed to a central part of the ceiling 7 around the front glass 6 forward in a running direction, a sensor containing portion 33 for containing an ultrasonic sensor 34, a protective member 35, which is formed on a lower face of the sensor containing portion 33, a rotation shaft 36 serving as an axis for rotating the sensor containing portion 33, and a rotation driving unit (not shown) for rotating the rotation shaft 36. The rotation driving unit may be a motor. FIG. 13 is a view showing a state where the sensor containing portion 3 is rotated around the rotation shaft 36 by half-turn.

The ultrasonic sensor 34 includes a transmission section 34a for transmitting a ultrasonic wave and a receiving section 34b for receiving a reflected wave from an obstacle. The ultrasonic sensor 34 can determine whether or not an illegal invasion into the vehicle is caused on the basis of a situation of receiving the ultrasonic wave at the receiving section 34b.

Figure 14:
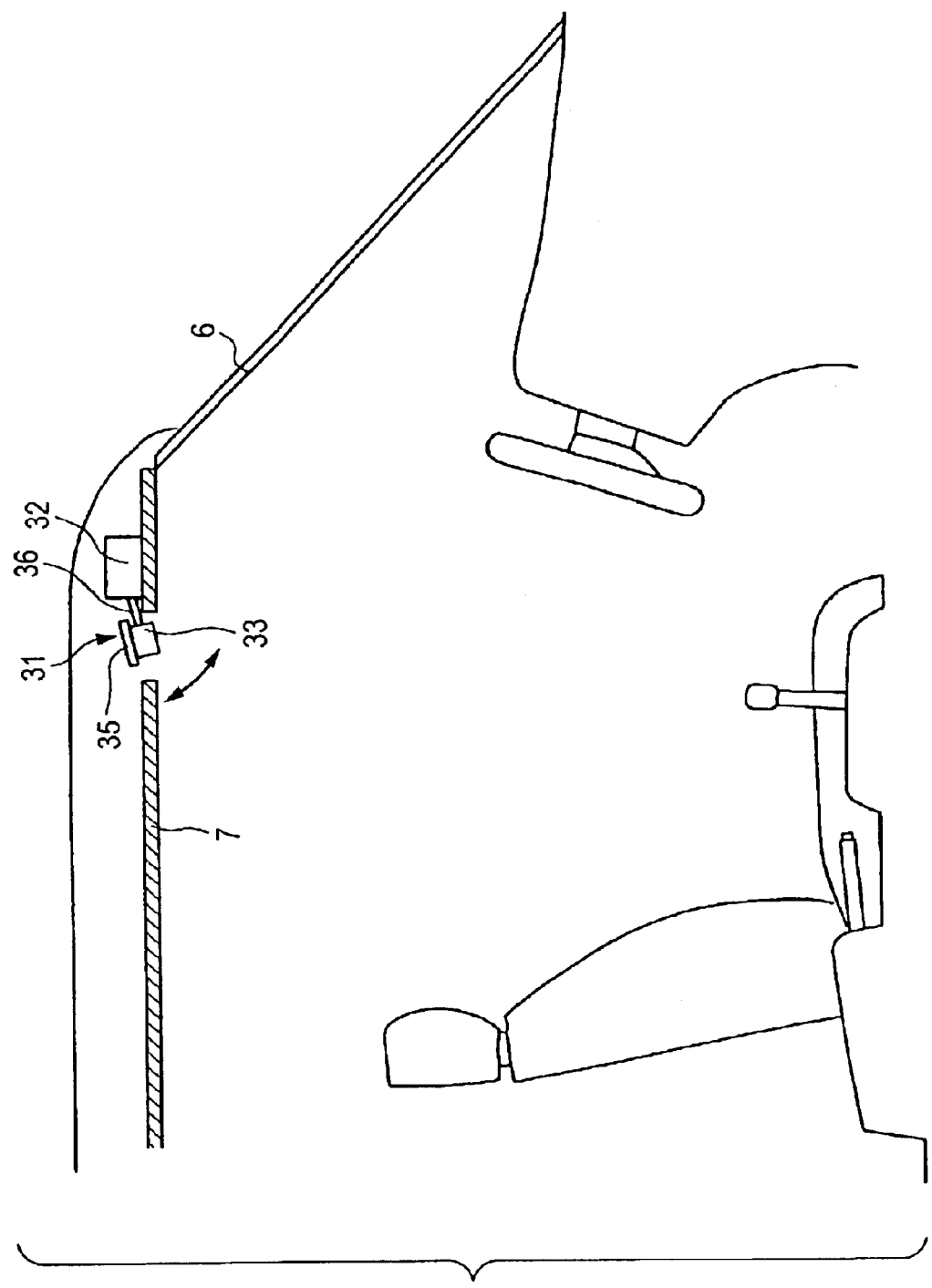
FIG. 14 is a partial cross-sectional side view showing a state where the invader detector according to the embodiment (3) is mounted within the vehicle.

The invader detector 31 is equipped with an angular displacement driving unit (not shown) for angularly displacing the sensor containing portion 33 within a vertical plane, with a length direction of the rotation shaft 36 as diameter, as shown in FIG. 14. The angular displacement driving unit may be a motor. In FIG. 14, the invader detector 31 is in a state where the invader detector 31 is moved to a detection position.

With the invader detector according to the embodiment (3), the sensor containing portion 33 is rotated around the rotation shaft 36, whereby the ultrasonic sensor 34 contained in the sensor containing portion 33 is directed toward inside of the vehicle without occupying a lot of space.

Since the protective member 35 is formed on the lower face of the sensor containing portion 33, the sensor containing portion 33 can be protected. Simultaneously, the sensor containing portion 33 is stored in the bore portion defined in the ceiling 7 with good appearance.

In the invader detector according to the embodiment (3), the rotation driving unit for rotating the sensor containing portion 33 and the angular displacement driving unit for angularly displacing the sensor containing portion 33 are equipped. However, in the invader detector according to another embodiment, the rotation shaft 36 may have gears so that one driving unit performs the rotation driving and the angular displacement driving.

Figure 15:
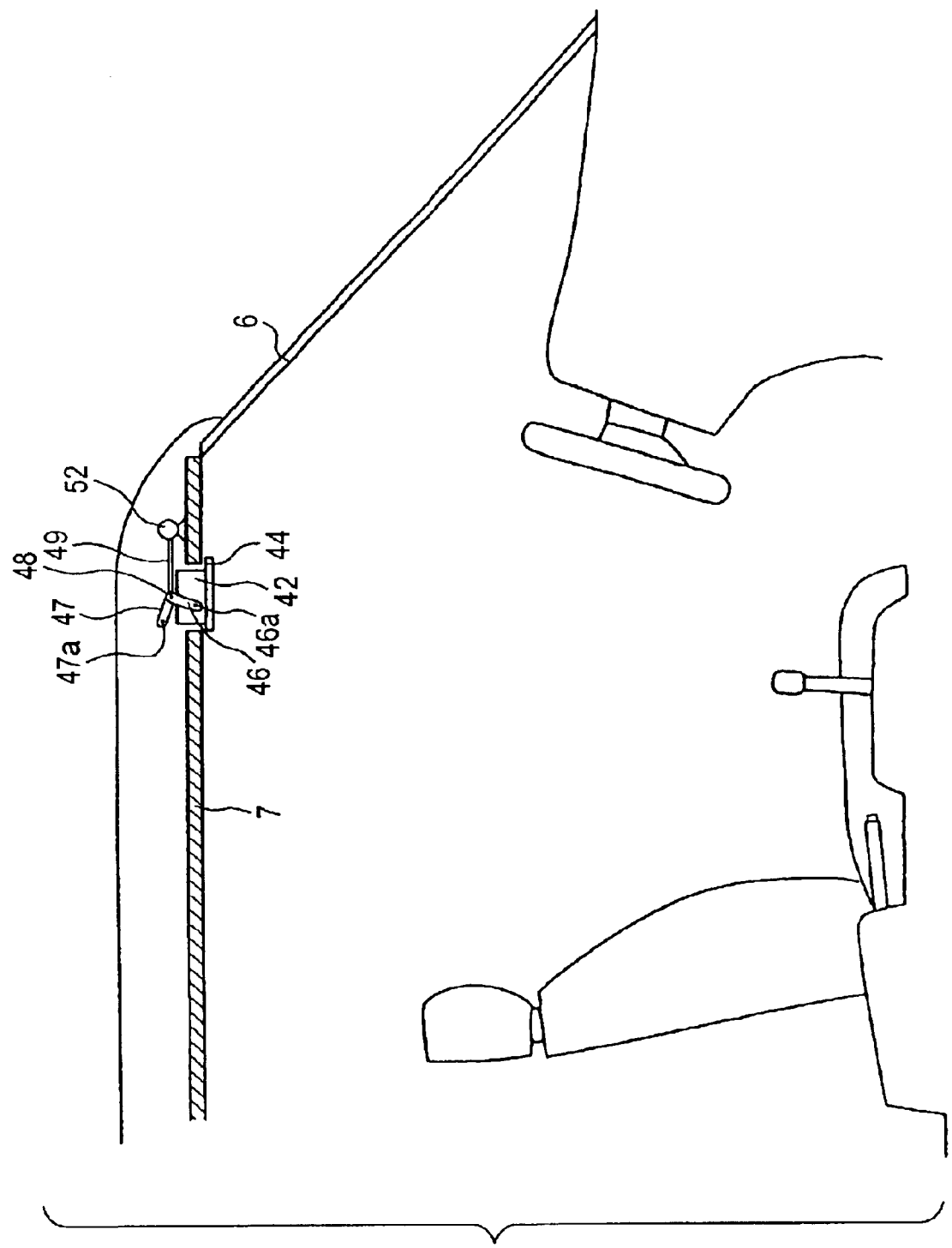
FIG. 15 is a partial cross-sectional side view showing a state where an invader detector according to an embodiment (4) is mounted within the vehicle.
Figure 16:
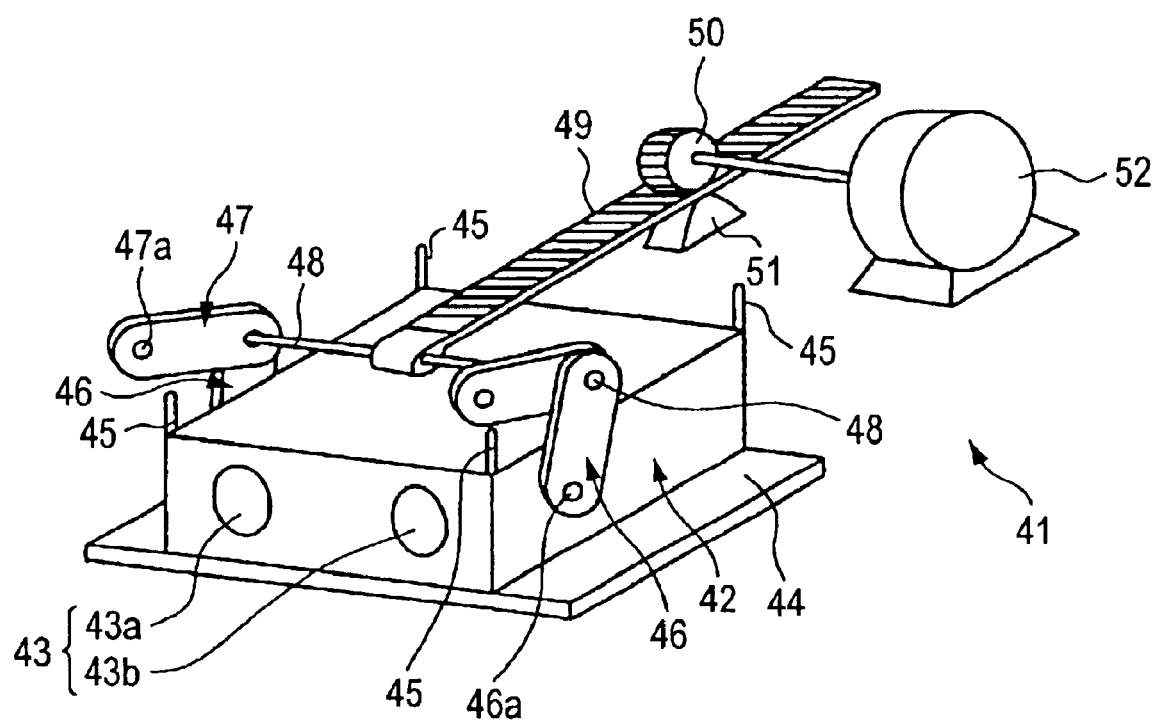
FIG. 16 is a perspective view schematically showing the invader detector according to the embodiment (4).

FIG. 15 is a partial cross-sectional side view showing a state where an invader detector according to an embodiment (4) is mounted within the vehicle. FIG. 16 is a perspective view schematically showing the invader detector according to the embodiment (4).

In these figures, numeral 41 denotes the invader detector. The invader detector includes a sensor containing portion 42 for containing a ultrasonic sensor 43, a protective member 44 formed on a lower face of the sensor containing portion 42, guide pins 45 formed at four corners on an upper face of the sensor containing portion 42, a support member 46 for supporting the sensor containing portion 42 around a support shaft 46a, a fixing member 47 fixed to the vehicle through a fixing shaft 47a at one end portion thereof, a linkage shaft 48 linking the support member 46 and the fixing member 47, a rack disposed on the linkage shaft 48, a gear 50 meshing with the rack 49, a support board 51 for supporting the rack 49 and the gear 50, and a rotation driving unit 52 for giving a rotation driving force to the gear 50. The support board 51 and the rotation driving motor 52 are attached and fixed to the central part of the ceiling 7 around the front glass 6 forward in the running direction.

The ultrasonic sensor 43 includes a transmission section 43a for transmitting an ultrasonic wave and a receiving section 43b for receiving a reflected wave from an obstacle. The ultrasonic sensor 43 determines whether or not an illegal invasion into the vehicle is caused on the basis of a situation of receiving the ultrasonic wave at the receiving section 43b.

When a rotation driving force in a counterclockwise direction is applied to the gear 50, the rack 49 and the linkage portion 48 are moved forward in the running direction to cause the linkage portion 48 to be lifted. Thus, the sensor containing portion 42 rises. On the other hand, when a rotation driving force in a clockwise direction is applied to the gear 50, the rack 49 and the linkage portion 48 are moved backward in the running direction to cause the linkage portion 48 to be pressed down. Thus, the sensor containing portion 42 descends.

Figure 17:
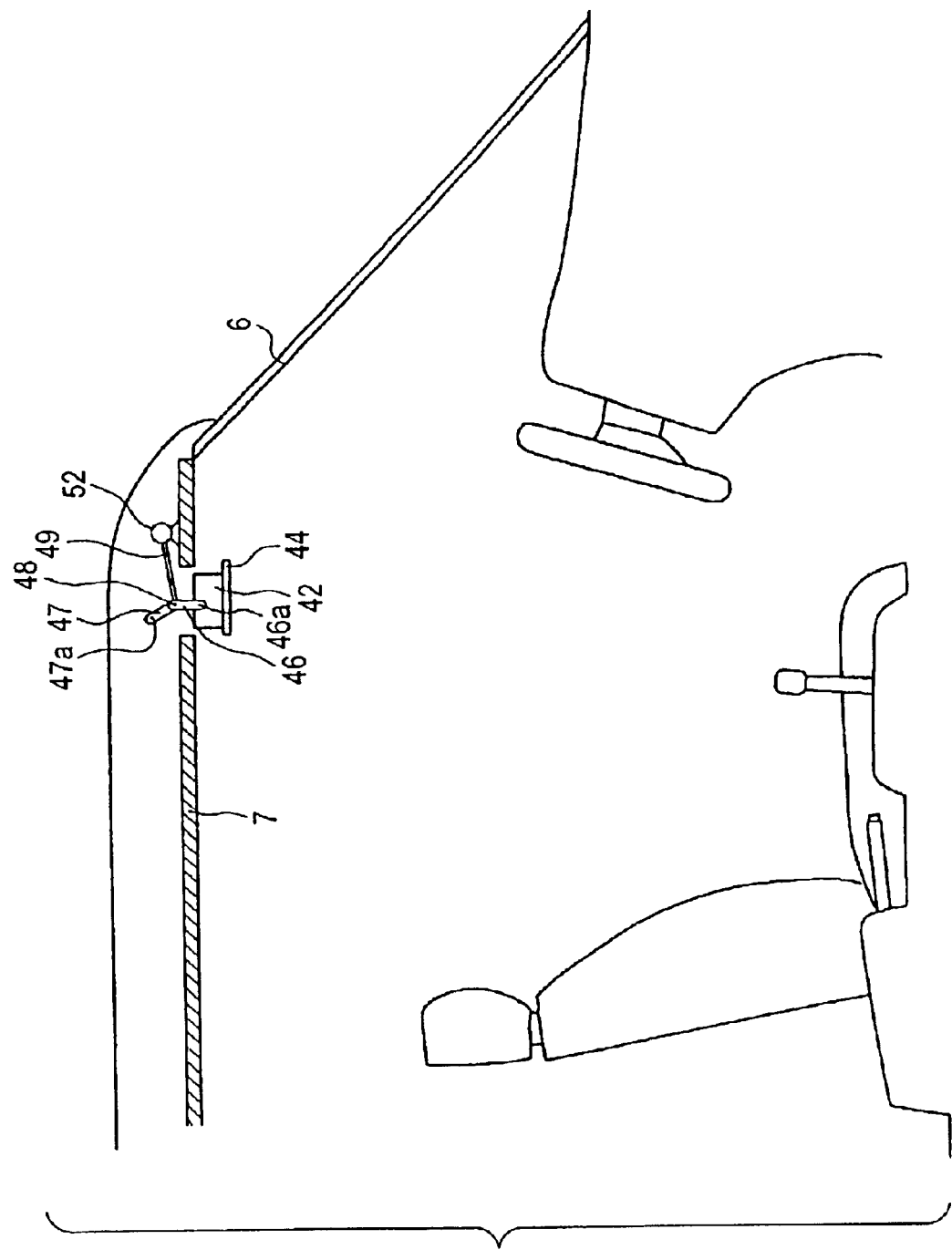
FIG. 17 is a partial cross-sectional side view showing a state where the invader detector according to the embodiment (4) is mounted within the vehicle.

Accordingly, the sensor containing portion 42 is stored or moved to the detection position by controlling the driving of the rotation driving unit 52. Incidentally, FIG. 17 is a view showing a state where the sensor containing portion 42 is moved to the detection position.

With the invader detector according to the embodiment (4), the sensor containing portion 42 is moved vertically, whereby the position of the sensor containing portion 42 on the vertical plane can be appropriately adjusted. Also, the guide pins 45 are formed at four corners of the sensor containing portion 42, whereby the sensor containing portion 42 is prevented from being caught on the ceiling 7 while being moved vertically. Therefore, the sensor containing portion 42 can make the smooth vertical movement.

Since the protective member 44 is formed on the lower face of the sensor containing portion 42, the sensor containing portion 42 can be protected while the sensor containing portion 42 is stored in the bore portion formed in the ceiling 7 with a good appearance.

With the invader detector according to the embodiments (1) to (4), each of invader detectors 1, 21, 31, 41 includes a controller (microcomputer 8 and so on) for controlling the driving unit 12. However, in the invader detector according to another embodiment, the invader detector 1, 21, 31 or 41 may not have the controller, but another control device having the controller is equipped within the vehicle to accept the control from the control device.

The processing operation of the controller provided for the control device is the same as that of the microcomputer in the invader detector according to the above embodiments. Therefore, the description of that processing operation is omitted.

[FIG. 5]

4a Transmission section
4b Reception section
8 Microcomputer
9 Transmission circuit
10 Detection circuit
11 Amplification circuit
12 Driving unit

[FIG. 6]

Start

S1 security is ON?
S3 Move the sensor containing portion 3 to detection position.
S5 security is OFF?
S7 Move the sensor containing portion 3 to storage position.

[FIG. 7]

4a Transmission section
4b Reception section
9 Transmission circuit
10 Detection circuit
11 Amplification circuit
12 Driving unit
22 Microcomputer
23 Detecting direction changing unit

[FIG. 9]

S11 security is ON?
S13 Move the sensor containing portion 3 to dection position.
S15 Move the sensor 4 to reference position.
S16 transmit the pulse.
S18 Memorize detection level corresponding to position of senor 4.
S19 retrieval is completed?
S20 Move the sensor 4.
S21 Calculate the detecting direction satisfying predetermined condition.
S22 Move the sensor to predetermined position based on calculation result.
S23 security is OFF?
S25 Move the sensor containing portion 3 to storage position.

What is claimed is:

1. An invader detector comprising:
    a fixing portion attached and fixed to a vehicle;
    a detecting unit for detecting an invader into the vehicle;
    a containing portion for containing the detecting unit; and
    a containing portion driving unit for driving the containing portion between a detection position where the detecting unit detects the invader into the vehicle and a storage position.

2. The invader detector according to claim 1,
    wherein the fixing portion is attached to a ceiling of the vehicle; and
    wherein the storage position is at least one of a bore defined in the ceiling and a back in the ceiling.

3. The invader detector according to claim 1, further comprising a detecting direction changing unit for changing a detecting direction of the detecting unit.

4. The invader detector according to claim 1,
    wherein the detecting unit includes a transmission unit and a reception unit, which are contained in the containing portion,
    the invader detector further comprising an interval changing unit for changing an interval between the transmission unit and the reception unit.

5. The invader detector according to claim 1,
    wherein the containing portion driving unit includes a first mechanism for angularly displacing the containing portion around an angular displacement shaft; and
    wherein the first mechanism anguraly displaces the containing portion around the angular displacement shaft to drive the containing portion between the detection position and the storage position.

6. The invader detector according to claim 5, wherein the containing portion driving unit includes a second mechanism for rotating the containing portion by at least half-turn around a rotation shaft.

7. The invader detector according to claim 1,
    wherein the containing portion driving unit includes a third mechanism for moving the containing portion vertically, when the fixing portion is attached and fixed to a predetermined position in the vehicle; and
    wherein the third mechanism drives the containing portion between the detecting portion and the storage position when the third mechanism is moved vertically.

8. The invader detector according to claim 1, further comprising a first control unit, which controls the containing portion driving unit to drive the containing portion to the detecting position when a first condition is satisfied.

9. The invader detector according to claim 1, further comprising a second control unit, which controls the containing portion driving unit to drive the containing portion to the storage position when a second condition is satisfied.

10. The invader detector according to claim 3, comprising a third control unit for controlling at least one of the containing portion driving unit and the detecting direction changing unit to retrieve state of at least one of the containing portion and the detecting unit, which satisfies a third condition,
    wherein the third control unit controls the at least one of the containing portion driving unit and the detecting direction changing unit based on the retrieval result to satisfy the third condition.

11. The invader detector according to claim 4, comprising a third control unit for controlling at least one of the containing portion driving unit and the interval changing unit to retrieve state of at least one of the containing portion and the detecting unit, which satisfies a third condition,
    wherein the third control unit controls the at least one of the containing portion driving unit and the interval changing unit based on the retrieval result to satisfy the third condition.

12. The invader detector according to claim 10, wherein the third condition involves that sum of detection level of a reflection wave reflected at a forward portion in a running direction in the vehicle and detection level of a reflection wave reflected at a rearward portion in the running direction in the vehicle is the maximum detection level.

13. The invader detector according to claim 10, wherein the third predetermined condition involves that detection level of a reflection wave reflected at a forward portion in a running direction in the vehicle is the maximum detection level.

14. The invader detector according to claim 10, wherein the third predetermined condition involves that detection level of a reflection wave reflected at a rearward portion in a running direction in the vehicle is the maximum detection level.

15. The invader detector according to claim 10, wherein when the containing portion is driven to the detection position, the third control unit conduct the control.

16. A controller for controlling driving of an invader detector, which includes:
 a fixing portion attached and fixed to a vehicle;
 a detecting unit for detecting an invader into the vehicle;
 a containing portion for containing the detecting unit; and
 a containing portion driving unit for driving the containing portion between a detection position where the detecting unit detects the invader into the vehicle and a storage position,
the controller comprising a first control unit, which controls the containing portion driving unit to drive the containing portion to the detecting position when a first condition is satisfied.

17. A controller for controlling driving of an invader detector, which includes:
 a fixing portion attached and fixed to a vehicle;
 a detecting unit for detecting an invader into the vehicle;
 a containing portion for containing the detecting unit; and
 a containing portion driving unit for driving the containing portion between a detection position where the detecting unit detects the invader into the vehicle and a storage position,
the controller comprising a second control unit, which controls the containing portion driving unit to drive the containing portion to the storage position when a second condition is satisfied.

18. A controller for controlling driving of an invader detector, which includes:
 a fixing portion attached and fixed to a vehicle;
 a detecting unit for detecting an invader into the vehicle, the detecting unit including a transmission unit and a reception unit, which are contained in the containing portion;
 a containing portion for containing the detecting unit;
 a containing portion driving unit for driving the containing portion between a detection position where the detecting unit detects the invader into the vehicle and a storage position,
 a detecting direction changing unit for changing a detecting direction of the detecting unit; and
 an interval changing unit for changing an interval between the transmission unit and the reception unit,
the controller comprising a third control unit for controlling at least one of the containing portion driving unit, the detecting direction changing unit, and the interval changing unit to retrieve state of at least one of the containing portion and the detecting unit, which satisfies a third condition,
 wherein the third control unit controls the at least one of the containing portion driving unit, the detecting direction changing unit, and the interval changing unit based on the retrieval result to satisfy the third condition.

19. The controller according to claim 18, wherein the third condition involves that sum of detection level of a reflection wave reflected at a forward portion in a running direction in the vehicle and detection level of a reflection wave reflected at a rearward portion in the running direction in the vehicle is the maximum detection level.

20. The controller according to claim 18, wherein the third predetermined condition involves that detection level of a reflection wave reflected at a forward portion in a running direction in the vehicle is the maximum detection level.

21. The controller according to claim 18, wherein the third predetermined condition involves that detection level of a reflection wave reflected at a rearward portion in a running direction in the vehicle is the maximum detection level.

22. The controller according to claim 18, wherein when the containing portion is driven to the detection position, the third control unit conduct the control.

* * * * *